United States Patent Office 3,006,365
Patented Oct. 31, 1961

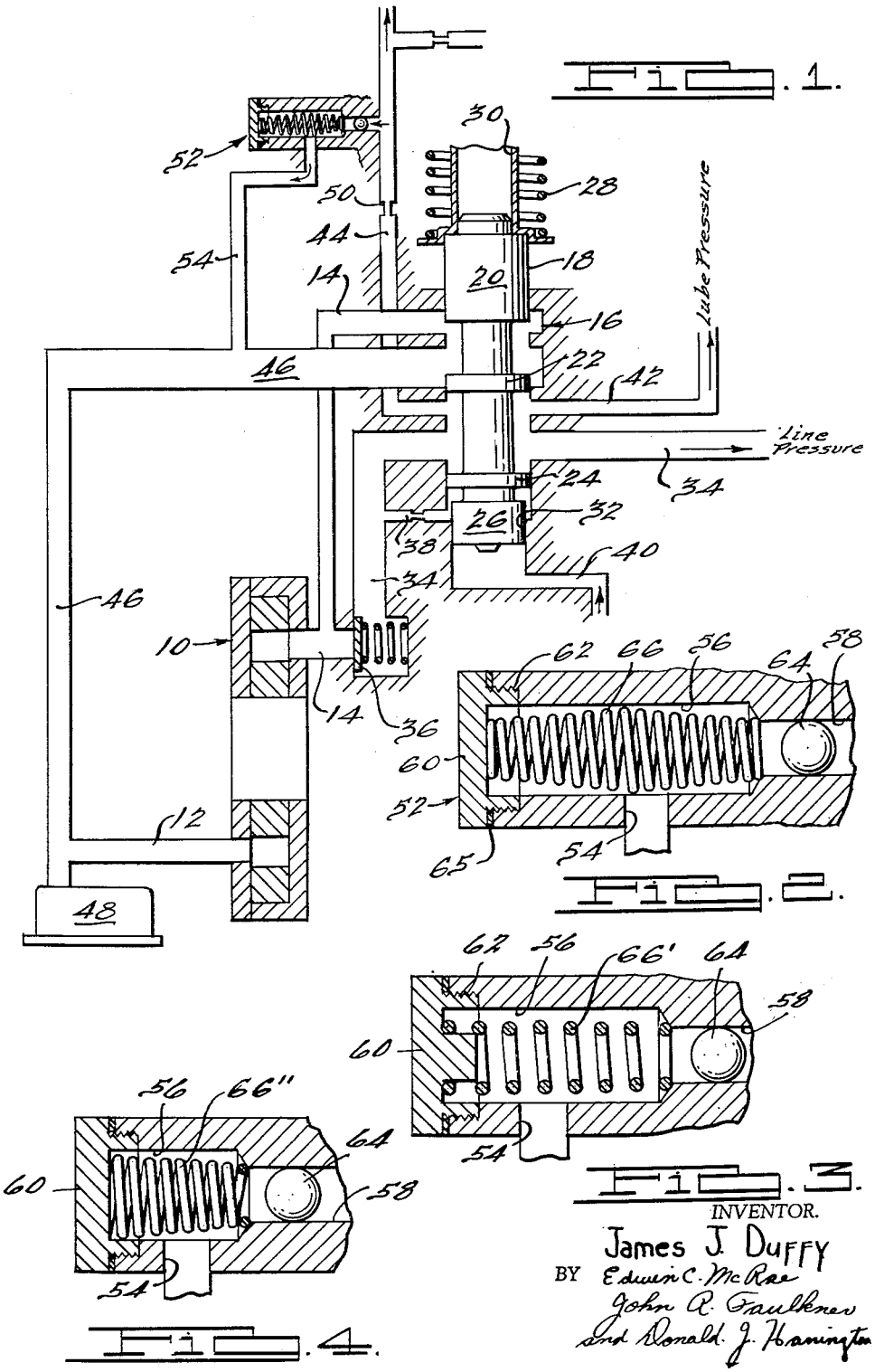

3,006,365
PRESSURE RELIEF VALVE
James J. Duffy, Detroit, Mich., assignor to Ford Motor Company, Dearborn, Mich., a corporation of Delaware
Filed July 2, 1957, Ser. No. 669,642
10 Claims. (Cl. 137—539)

My invention relates generally to a valve mechanism and more particularly to a spring loaded fluid pressure relief valve or bypass valve.

My invention finds particular utility in pressurized hydraulic systems wherein pressure regulation is required to maintain the operating pressure level at a desired maximum.

It is common practice to employ a simple, spring-loaded, ball check valve in hydraulic systems for controlling the degree of communication between a high pressure region of the system and a lower pressure region such as an exhaust passage. Such a valve is normally comprised of an annular valve seat against which a ball valve element is urged by a valve spring, the ball valve thereby controlling the rate of delivery of fluid through the annular valve seat. The valve spring acts against the forces produced by the pressure differential which exists across the annular valve seat and the calibration of the spring thus determines the magnitude of the pressure differential.

I have found that the movable ball valve element of such a valve mechanism of conventional construction tends to vibrate against the associated valve seat while performing the pressure regulating function and this causes an undesirable, audible valve chatter.

According to a principal feature of my invention, I have provided a check valve assembly capable of pressure regulation without an accompanying valve chatter. This is accomplished by providing a ball valve element within a fluid pressure passage and spring loading the same to provide a floating valve movement, the diameter of the ball being substantially equal to the diameter of the fluid passage.

The improved valve mechanism above described being a principal object of my invention, it is a further object of my invention to provide a check valve mechanism of simplified construction and which may be readily adapted to be used in a variety of hydraulic circuits with a minimum of modification being required ao adapt the same for operation in any particular operating environment.

It is a further object of my invention to provide a check valve mechanism which is substantially free of valve chatter or other audible valve vibrations and which is formed without a conventional valve seat for the movable valve element.

For the purpose of more particularly describing the principal features of my instant invention, reference will be made to the accompanying drawings wherein:

FIGURE 1 is a schematic representation of a portion of a pressurized fluid circuit having a fluid pressure source and a pressure regulator valve mechanism for regulating the magnitude of the pressure supplied by said source. This circuit provides an environment for the improved valve mechanism of my instant invention;

FIGURE 2 is an enlarged assembly view of one embodiment of my improved valve structure;

FIGURE 3 is an enlarged assembly view of a second embodiment of my improved valve structure; and FIGURE 4 is an enlarged assembly view of a third embodiment of the improved valve structure of my instant invention.

Referring first to FIGURE 1, numeral 10 designates a positive displacement pump having a pressure inlet passage 12 and a high pressure discharge passage 14. A pressure regulator valve mechanism is generally designated by numeral 16 and it comprises a multiple land valve spool 18 having spaced valve lands 20, 22, 24 and 26. Valve spool 18 is urged in a downward direction as viewed in FIGURE 1 by a valve spring 28 seated on a retainer 30 and it is movably disposed in a cooperating valve chamber 32.

Pressurized fluid is transmitted from the discharge side of pump 10 through discharge passage 14 to the valve chamber 32 at a location adjacent valve land 20. A line pressure passage 34 communicates with the valve chamber 32 at a location intermediate valve lands 22 and 24 and it communicates with a high pressure discharge passage 14. A one-way check valve 36 provides communication between passages 14 and 34. The valve land 26 is somewhat smaller than adjacent valve land 24 thereby defining a differential pressure area. A bypass passage 38 extends from line pressure passage 34 to the chamber defined by the valve lands 24 and 26 thereby subjecting the differential area produced by the valve lands to line pressure. The net fluid pressure force acting on the valve element 18 by this line pressure is in an upward direction as viewed in FIGURE 1 since the effective area of valve land 24 is somewhat larger than the corresponding area of valve land 26, this upward force being balanced by the force of valve spring 28. A suitable fluid restriction may be placed in bypass passage 38 as indicated to prevent uncontrolled vibrations of the valve element 18. During operation, the bottom of valve land 26 is adapted to be acted upon by a control pressure signal and to provide an auxiliary upward force to supplement the pressure force acting on the differential area of valve lands 24 and 26, this pressure force being supplied to chamber 32 through passage 40.

A lubricating oil passage 42 communicates with valve chamber 32 at a point intermediate valve lands 22 and 24 at a location adjacent line pressure passage 34. If it is assumed that this pressure regulator circuit is used with a multiple speed, automatic power transmission mechanism, passage 42 may extend to the power delivery gears and shafts within the transmission. If the transmission includes a hydrokinetic torque converter in conjunction with the power delivery gear elements, it is necessary to charge the converter with fluid pressure to condition the same for torque delivery. A converter pressure passage may be provided for this purpose as shown at 44 and it communicates with the valve chamber 32 at a location adjacent line pressure passage 34.

A fluid pressure return passage 46 extends from the valve chamber 32 at a point intermediate the previously described passages 14 and 44. Return passage 46 extends to a sump 48 located in a low pressure region of the circuit.

Prior to the time that pump 10 begins to operate, valve element 18 will assume a downward position, as viewed in FIGURE 1, under the influence of valve spring 28. Valve land 22 will in this instance prevent communication between passage 34 and the passages 42, 44 and 46. Similarly, valve land 20 will block passage 14.

After pump 10 begins to function, line pressure passage 34 will become pressurized thereby energizing the various portions of the circuit with which the pressure regulator mechanism of FIGURE 1 is associated. When the requirements of the circuit are satisfied, the line pressure in passage 34 will begin to increase and a corresponding pressure increase will take place in the pressure chamber defined by valve lands 24 and 26. Valve element 18 will thus tend to move in a vertically upward direction until lubricating passage 42 and converter pressure passage 44 are uncovered by valve land 22. After communication is thus established between line pressure passage 34 and the passages 42 and 44, the lubrication system and the converter pressure will approach their operating pressure levels and the valve element 18 will thereafter continue to move until valve land 20 uncovers passage 14. Any increase in line pressure will thus be prevented since the fluid discharged by the pump 10 will be bypassed into the return passage 14. If the speed of the pump 10 is such that the passage 14 cannot accommodate the entire output of the pump 10, the valve element 18 will move in an upward direction until valve land 22 uncovers passages 46 thereby providing direct communication between passages 34 and 46.

I have provided a fluid restriction in converter passage 44 as indicated at 50 thereby providing a calibrated pressure differential. To maintain a desired operating pressure in the converter the check valve of my instant invention may be situated on the downstream side of restriction 50, said valve mechanism being designated in FIGURE 1 by numeral 52. A bypass passage 54 extends from valve mechanism 52 to pressure return passage 46 as indicated.

As best seen in FIGURE 2, valve 52 comprises a spring chamber 56 located in a suitable housing. By preference, this housing may form a part of the housing for the other valve components of the control mechanism. A passage 58 extends from converter pressure passage 44 to the spring chamber 56, the latter further communicating with the aforementioned bypass passage 54. The spring chamber 56 may be closed by a threaded closure member 60 and the valve housing may be suitably threaded as shown at 62 to accommodate the threaded closure member 60. A suitable fluid seal 65 may be provided if desired between the housing and the closure member 60.

A ball valve 64 is situated in passage 58 and it is formed with a diameter substantially equal to the diameter of the passage 58 but with sufficient clearance to permit floating movement therein. According to the preferred embodiment of my invention, as shown in FIGURE 2, a barrel shaped spring 66 may be situated in the spring chamber 56 and seated at one end thereof in the closure member 60. The spring chamber 56 is formed in the innermost end with a conical surface surrounding the passage 58. The spring 66 is seated against the conical surface as indicated, the outside diameter of the end convolution of spring 66 being sufficiently great to prevent the spring 66 from entering the passage 58. However, the inside diameter of the end convolutions of spring 66 is sufficiently small to prevent the ball valve 64 from moving into the spring chamber 56. I contemplate that the included angle of the conical surface may be within a rather large range, although an included angle of 120° has been proven to be very satisfactory.

The spring 66 may be calibrated so that the ball valve 64 is held in passage 58 against the opposing force of the fluid pressure in passage 44. However, when the magnitude of the fluid pressure in passage 44 reaches a precalibrated maximum value, the spring 66 will yield sufficiently to cause the ball valve 64 to move in a left-hand direction as viewed in FIGURE 2 until clearance is provided between the ball 64 and the circular edge between passage 58 and the surrounding conical surface. It is thus apparent that ball valve 64 is caused to float freely in an axial direction and is effective to provide pressure regulation although it does not include a valve seat of the conventional type.

FIGURE 3 shows a second embodiment of my invention and it differs from the embodiment illustrated in FIGURE 2 in that the valve spring, identified by numeral 66', is of a conventional shape with convolutions of uniform diameter. If desired, spacers may be provided between the spring of FIGURE 2 and the surrounding valve casing within the spring chamber in order to prevent transverse movement of the spring.

FIGURE 4 illustrates another embodiment of my invention but it differs from the embodiments of FIGURES 2 and 3 in that it is formed with a conical spring, shown at 66'', seated in the closure member in a suitable fashion. This construction provides added stability and reduces any tendency of the valve spring to oscillate in a transverse direction during operation.

Although I have described certain preferred embodiments of my invention, I contemplate that other variations may be made thereto without departing from the scope of my invention as defined by the following claims.

I claim:

1. In a hydraulic circuit including a first pressurized conduit and a second conduit of relatively reduced pressure; a pressure relief valve mechanism including a bypass passage interconnecting said first and second conduits, said bypass passage having two portions of differential diameter, a valve element movably disposed in the smaller diameter passage portion, the cross sectional dimension of said valve element being substantially equal to the diameter of said smaller diameter passage portion with a sufficient clearance to permit free movement of said valve element, a shoulder formed at the juncture of said passage portions, and a valve spring situated in the larger diameter passage portion with one end thereof seated on said shoulder, the pressure in the smaller diameter passage portion being greater than the pressure in the larger diameter passage portion, said valve spring including a portion situated in the path of motion of said valve element and engageable therewith when said valve element is urged by fluid pressure toward the larger diameter passage portion to produce an annular valve opening surrounding said valve element and to establish a floating condition of said valve element, the pressure differential established across said valve element creating a force which is opposed by said valve spring.

2. In a hydraulic circuit including a pressurized conduit and a region of relatively reduced pressure; a pressure relief valve mechanism including a bypass passage interconnecting said conduit and said region of reduced pressure, said bypass passage having two portions of differential diameter, the smaller diameter passage portion communicating with said pressurized conduit and the larger diameter passage portion communicating with said region of reduced pressure, a valve element movably disposed in the smaller diameter passage portion, the cross sectional dimension of said valve element being substantially equal to the diameter of said smaller diameter passage portion with a sufficient clearance to permit free movement of said valve element, a shoulder formed at the juncture of said passage portions, and a valve spring situated in the larger diameter passage portion with one end thereof seated on said shoulder adjacent said valve element, said valve spring including a portion situated in the path of motion of said valve element and engageable therewith when said valve element is urged by fluid pressure toward the larger diameter passage portion to produce an annular valve opening surrounding said valve element and to establish a floating condition of said valve element, the pressure differential established across said valve element creating a force which is opposed by said valve spring.

3. In a hydraulic circuit including a pressurized conduit and a region of relatively reduced pressure; a pressure relief valve mechanism including a housing, a bypass passage formed in said housing interconnecting said conduit with said region of reduced pressure, said bypass passage including a spring chamber and a section of reduced cross sectional area, the latter communicating with said pressurized conduit, a valve element movably disposed in said reduced area section, the cross sectional dimension of said valve element being substantially equal to the corresponding dimension of said section of reduced cross sectional area, a shoulder formed at the juncture of said spring chamber and said section of reduced cross sectional area and a spring located in said spring chamber and seated on said shoulder, said spring being engageable with said valve element upon movement of the latter toward said spring chamber, said valve element thereby assuming a floating condition during operation, the pressure force acting on said valve element being balanced by the force of said spring whereby a regulated pressure is maintained in said region of reduced pressure.

4. In a hydraulic circuit including a pressurized conduit and a region of relatively reduced pressure; a pressure relief valve mechanism including a housing, a bypass passage formed in said housing interconnecting said conduit with said region of reduced pressure, said bypass passage including a spring chamber and a section of circular cross sectional area, the latter having a reduced cross sectional dimension and communicating with said pressurized conduit, a ball valve element movably disposed in said passage section, said valve element having a diameter substantially equal to the corresponding dimension of said passage section, a shoulder formed at the juncture of said spring chamber and said bypass passage section and a spring located in said spring chamber and seated on said shoulder, said spring being engageable with said ball valve element upon movement of the latter toward said spring chamber, said valve element thereby assuming a floating condition during operation, the pressure force acting on said valve being balanced by the force of said spring whereby a regulated pressure is maintained in said region of reduced pressure.

5. In a hydraulic circuit including a pressurized conduit and a region of relatively reduced pressure; a pressure relief valve mechanism including a housing, a bypass passage formed in said housing interconnecting said conduit with said region of reduced pressure, said bypass passage including a spring chamber and a section of circular cross sectional area, the latter communicating with said pressurized conduit, a ball valve element movably disposed in said bypass passage, the diameter of said valve element being substantially equal to the diameter of said bypass passage with sufficient clearance to permit free movement of said valve element, a shoulder formed at the juncture of said spring chamber and said bypass passage section and a coil spring located in said spring chamber and seated on said shoulder with one end thereof situated adjacent said ball valve element, said spring including a coil adjacent said ball valve element with the outside diameter thereof greater than the diameter of said section of circular cross sectional area and with the inside diameter thereof smaller than the diameter of said ball valve element, the pressure force acting on said ball valve element being balanced by the force of said spring upon movement of said ball valve element toward said spring chamber under the influence of fluid pressure whereby a regulated pressure is maintained in said region of reduced pressure.

6. The combination as set forth in claim 5 wherein said spring is formed with multiple coils, and wherein the other end of said spring is seated on a relatively stationary portion of said mechanism, the coils intermediate each end of said spring being larger in diameter than the diameter of the coils at either end.

7. The combination as set forth in claim 5 wherein said spring is formed with multiple coils, each coil being of substantially the same diameter.

8. The combination as set forth in claim 5 wherein said spring is formed with multiple coils and wherein the other end of said spring includes a coil of a relatively large diameter with respect to the diameter of the coil at said one end, said spring being substantially conical in shape.

9. The combination as set forth in claim 5 wherein said spring is formed with multiple coils and wherein the geometric axis of said spring is aligned with respect to the axis of said area of circular cross section.

10. In a hydraulic circuit including a pressurized conduit and a region of relatively reduced pressure; a pressure relief valve mechanism including a housing, a bypass passage formed in said housing interconnecting said conduit with said region of reduced pressure, said bypass passage including a spring chamber and a section of circular cross sectional area, the latter communicating with said pressurized conduit, the region of discontinuity between said spring chamber and said area of circular cross section being characterized by a conical surface, a ball valve element movably disposed in said area of circular cross section, the diameter of said valve element being substantially equal to the diameter of the cooperating area of circular cross section of said bypass passage with sufficient clearance to permit free movement of said valve element and a multiple coil spring located in said spring chamber with the axis thereof substantially in alignment with the geometric axis of said area of circular cross section, one end of said spring being seated on said conical surface, the coil engaging said conical surface having an outside diameter greater than the diameter of said passage section of circular cross sectional area and with an inside diameter smaller than the diameter of said ball valve element, said spring being engageable with said ball valve element upon movement of the latter toward said spring chamber, the pressure force acting on said ball valve element being balanced by the force of said spring whereby a regulated pressure is maintained in said region of reduced pressure.

References Cited in the file of this patent

UNITED STATES PATENTS

| 1,027,587 | Brenner et al. | May 28, 1912 |
| 1,999,693 | Hill | Apr. 30, 1935 |
| 2,188,463 | Mercier | Jan. 30, 1940 |
| 2,316,445 | Marshall | Apr. 13, 1943 |
| 2,587,421 | Willach | Feb. 26, 1952 |
| 2,659,206 | Carlson | Nov. 17, 1953 |

FOREIGN PATENTS

| 969,086 | France | May 17, 1950 |
| 58,686 | France | Oct. 28, 1953 |
| 1,138,164 | France | Jan. 21, 1957 |